No. 746,676. PATENTED DEC. 15, 1903.
R. A. COFFEE.
GRAIN DRILL AND FERTILIZER DISTRIBUTER.
APPLICATION FILED APR. 25, 1903.
NO MODEL. 2 SHEETS—SHEET 1.
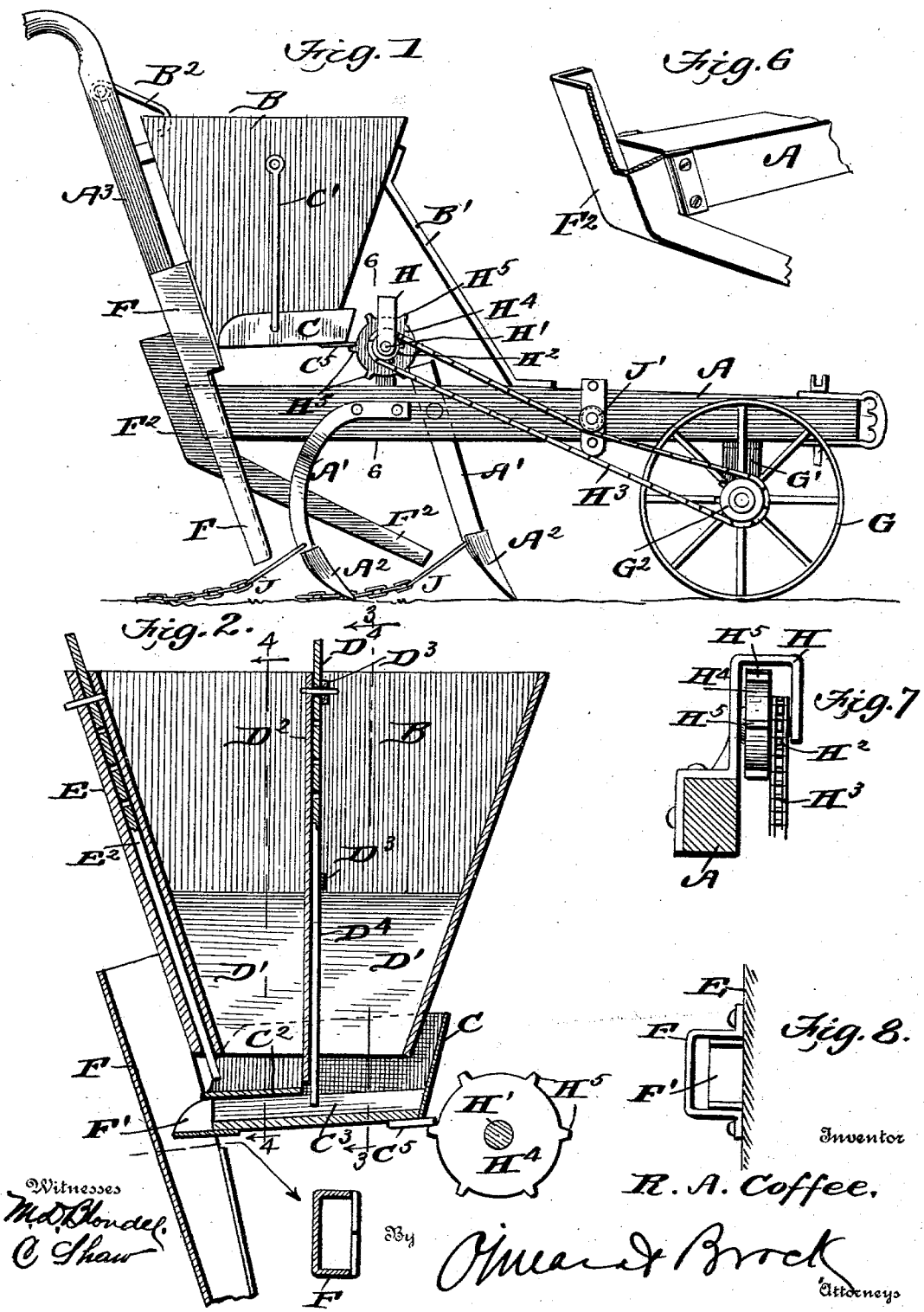
Inventor
R. A. Coffee.

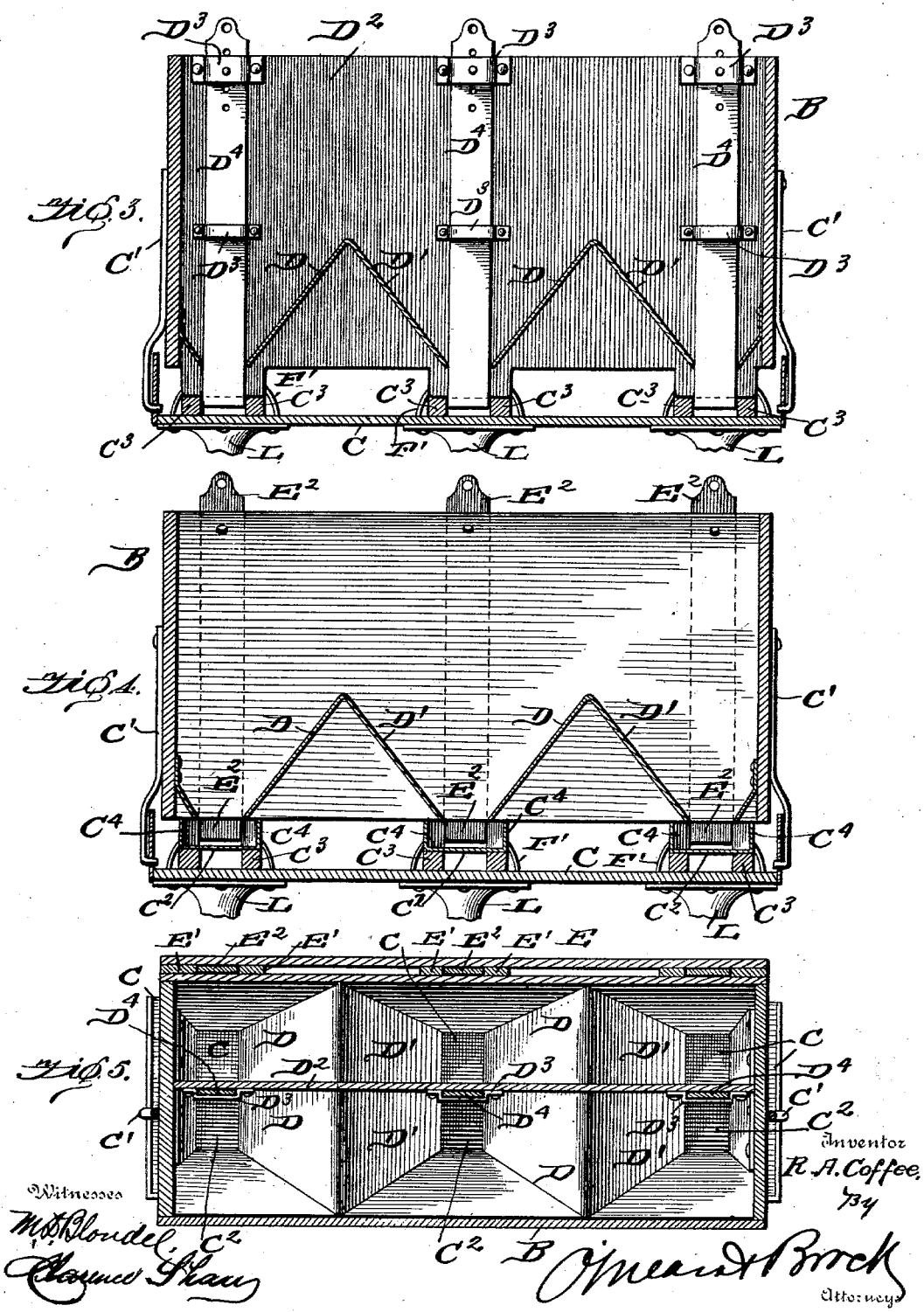

No. 746,676. Patented December 15, 1903.

UNITED STATES PATENT OFFICE.

ROBERT A. COFFEE, OF ANDERSON, SOUTH CAROLINA.

GRAIN-DRILL AND FERTILIZER-DISTRIBUTER.

SPECIFICATION forming part of Letters Patent No. 746,676, dated December 15, 1903.

Application filed April 25, 1903. Serial No. 154,336. (No model.)

*To all whom it may concern:*

Be it known that I, ROBERT A. COFFEE, a citizen of the United States, residing at Anderson, in the county of Anderson and State of South Carolina, have invented a new and useful Grain-Drill and Fertilizer-Distributer, of which the following is a specification.

My invention is an improvement in grain and fertilizer distributer, and has for its object the construction of a device of this character, one which will feed the grain and fertilizer to three furrows and at the same time and one which will distribute them through the same horn or conductor, but at the same time not mix them, and which will permit their being fed separately.

Briefly considered, my invention consists of a casing divided into a plurality of hoppers open at the bottom, said casing being mounted on a plow-beam, a rearwardly-open receptacle swingingly arranged below the hoppers, distributing-horns leading from the receptacle, and means for rocking or shaking the receptacle.

The details of construction are further pointed out hereinafter and particularly set forth in the claims and shown in the accompanying drawings, in which—

Figure 1 is a side elevation of my improved distributer. Fig. 2 is a vertical section taken centrally through the device, the plow and operating mechanism being omitted. Fig. 3 is a section about on the line 3 3 of Fig. 2. Fig. 4 is a section on the line 4 4 of Fig. 2. Fig. 5 is a sectional plan view. Fig. 6 is a detail perspective view showing the middle horn, parts being broken away, and showing the manner of securing it to the rear of the plow-beam. Fig. 7 is a detail view of the knocker-wheel, the plow-beam being in section. Fig. 8 is a detail plan view of the upper end of one of the horns, showing mode of securing same to the box.

In the construction of my distributer I employ a plow-beam A having feet or standards A', preferably three in number, the central foot being in advance of the two outer ones. These feet carry the usual points $A^2$, and the plow has the usual handles $A^3$. The plow itself forms no part of my invention, but simply provides a support for it.

A casing or hopper B, rectangular in cross-section and having inwardly and downwardly inclined walls, is open at the top and bottom and is held a short distance above the plow-beam by brackets B', bolted at one end to the beam and at their upper ends to the forward side of the casing. A link $B^2$ is pivotally secured to each handle and at its opposite end is secured to the rear side of the casing. Beneath the casing is a shallow box-like receptacle or tray C, which extends in advance of the lower part of the casing and also slightly beyond its ends. Arms C', offset adjacent their lower ends, are pivotally secured adjacent their upper ends to the ends of the casing, while their lower ends are secured to the ends of the receptacles C. Transversely-arranged oppositely-inclined partitions D D' divide the lower part of the casing into three hoppers, which are subdivided by a longitudinal vertical partition $D^2$, which extends from the bottom to the top of the casing. This arrangement divides the casing into six hoppers, as clearly shown in Fig. 5, all of which open into the box C. The partition $D^2$ is extended into the box C, leaving a small space between the lower edge of the partition and the bottom of the box. To the rear of the partition $D^2$ and in the plane of its lower edge is the horizontal partitions $C^2$, supported on cleats $C^3$, running transversely across the bottom of the box. These cleats form a series of channel-ways open at the rear end and closed at the forward end by the front wall of the box. On one side of the partition $D^2$ are secured a number of brackets $D^3$, the upper brackets being perforated, and in these brackets slide the vertical strips or cut-offs $D^4$, each strip having a plurality of perforations, one above the other, in its upper portion. The lower portions of these strips extend into channels formed by the cleats closing same to the rear of the front row of hoppers, the partition $C^2$ preventing anything from the rear row of hoppers from entering said channels. A board E is secured to the rear side of the hopper, being spaced from it by the guide-strips E', and between these strips slide the strips or cut-offs $E^2$. Their lower ends being adapted to rest on the partitions $C^2$ and to prevent the fertilizer from falling to the bottom of the box C, side pieces $C^4$ are extended along the partitions, whereby an upper channel-way is formed above that formed by each pair of cleats, closed at their forward ends to the partition D² and at their rear ends by the sliding strips E². These last-named strips have a plurality of perforations formed adjacent their upper ends, and perforations alining with each other and adapted to aline with those of the strips are formed in the rear wall of the casing and in the board E.

Distributing-horns F are secured to the rear of the box B. These horns, two in number, open at their upper ends into the various channel-ways formed below the hoppers, each horn opening into an upper and lower channel-way. Lips F' extend from the rear of the box C and project into the forward cut-out portion of the horns F, as shown in Fig. 2. These are the outer horns, and the lips F' aline with the outer channels C³. The middle horn F² is secured to the rear of the plow-beam, and the lip leading to same from the central channel C³ is long enough to pass between the plow-handles. Each of these horns is adapted to discharge in the rear of one of the plow-points.

To shake the box C, a wheel G is journaled in any suitable manner on beam A, as by a bracket G', in advance of the casing, and on the same shaft is fixedly secured a sprocket-wheel G². A bracket H is secured to the top of the beam A, and on a revoluble shaft H' in this bracket is secured a small sprocket-wheel H². A sprocket-chain H³ connects the two sprocket-wheels. On the shaft H' and rotating with it is secured a wheel H⁴, having projections H⁵. The projections strike a pin C⁵, secured to the bottom of the box C and projecting in advance of same, and in this manner the box is agitated and the grain and fertilizer shaken out through the lips into the horn.

Short rearwardly-extending bars J are attached to and project from the standards A', and to them are attached chains the ends of which drag upon the ground behind the discharge-spouts of the horns.

The operation of my device is as follows: Grain is placed into the forward hoppers and fertilizer into the rear hoppers. The strips D⁴ and E² are raised and held in position by pins D⁵ and E³, which fit in the perforations. The rotation of the wheel G, which runs on the ground, imparts motion to its shaft, which in turn rotates the sprocket-wheel G². Through the chain H³ and wheel H² motion is imparted to the wheel H⁴, and the projections H⁵, striking the under side of the pin C⁵, shake the box C. The grain passes through the channel-ways formed by the cleats to the horns, while the fertilizer, falling on the partition or false bottoms C², passes beneath the lower edges of the strips E³ and falls into the horn. The distribution of either can be cut off by lowering the strips and the exact proportion of each can be regulated by adjustment of the strips. An idler J', carried by the beam A, bears on the chain H³ and serves to hold the chain taut.

Having thus fully described my invention, what I claim as new, and desire to secure by Letters Patent, is—

1. A device of the kind described comprising a plurality of downwardly-open hoppers, a shallow receptacle swingingly secured beneath the hoppers, a plurality of distributing-horns secured to the rear of the hoppers, means for closing communication between the hoppers and the horns, and means for shaking the receptacle.

2. A device of the kind described comprising a casing having a plurality of downwardly-open hoppers arranged in forward and rearward sets, a receptacle arranged beneath and pivotally secured to the casing, upper and lower channel-ways arranged in said receptacle, the lower channel-ways communicating with the forward hoppers and the rear channel-ways communicating with the rear hoppers, distributing-horns each adapted to communicate with an upper and lower channel-way, means for closing said channel-ways, and means for shaking the receptacle.

3. The combination with a plurality of downwardly-open hoppers, a shallow receptacle pivotally secured below said hoppers, a vertical partition extending through the hoppers and into the receptacle, cleats arranged on the bottom of the receptacle transverse to the partition, horizontal partitions arranged on said cleats in the rear of the partition, distributing-horns secured in the rear of the receptacle, the upper end of each horn having communication with a hopper in advance of, and one in the rear of, the vertical partition, and means for shaking the receptacle.

4. The combination with a plow-stock, of a casing supported thereon, a vertical partition arranged in and extending below said casing, a plurality of hoppers formed in the casing, in advance of and to the rear of said partition, a movable receptacle pivotally swung below said casing, a plurality of horns arranged, in the rear of and extending downward below the receptacle, the upper end of each horn having communication with a hopper in advance of and one to the rear of the partition, and means for shaking the receptacle.

ROBT. A. COFFEE.

Witnesses:
F. H. BOLEMAN,
E. B. TRIBBLE.